Patented Oct. 10, 1933

1,929,603

UNITED STATES PATENT OFFICE 1,929,603

MANUFACTURE OF RUBBER GOODS

Edward Arthur Murphy, Erdington, Birmingham, and Eric William Bower Owen, Walmley, England, assignors to Dunlop Rubber Company Limited, a British corporation No Drawing. Application June 8, 1931, Serial No. 543,015, and in England July 29, 1930

7 Claims. (Cl. 18—58)

This invention comprises improvements in or relating to the manufacture of goods of rubber or similar material of the kinds hereinafter specified, and is particularly concerned with the manufacture of rubber or similar material of sponge-like or cellular structure from aqueous emulsions or dispersions thereof.

In the manufacture of goods of rubber or similar material of sponge-like or cellular structure from aqueous emulsions or dispersions prior to the present invention the emulsions or dispersions were converted into frothy condition wherein the froth comprised a gas and the emulsions or dispersions were still in the reversible condition and thereafter the frothy mass was caused to set to a permanent structure of irreversible solid material.

In processes prior to our present invention, the outer surface layers of the frothy mass which are allowed to come into contact with the setting medium generally consists of a thin continuous skin of rubber which hides the sponge structure of the material underneath.

The object of the present invention is to manufacture goods of rubber or similar material of sponge-like or cellular structure from aqueous emulsions or dispersions thereof wherein the formation of the aforesaid continuous surface skins is avoided, thereby permitting the cellular structure of the rubber to be visible.

According to one embodiment of the invention the frothy mass of aqueous emulsions or dispersions aforesaid comprising a gas and the emulsions or dispersions still in the reversible condition is allowed to set with the exception of the outer layer or layers, such layer or layers for instance not being allowed to come into direct contact with the setting medium. For instance, a former or mould is first dipped into a suitable coagulant solution and is then dipped into a froth of latex mixing. The deposit thus obtained on withdrawal is allowed to stand for a short period, for instance, 20-60 seconds, during which time coagulation takes place commencing from the surface in contact with the coagulant and proceeding through the deposit to the outer surface. Before this progressive coagulation reaches the outer surface the deposit is washed as for instance with water or dilute alkali solution. In this manner the latex which would normally form the outer skin is removed.

Another way of carrying out the embodiment of the invention is as follows. For instance, a former or mould capable of being integrally heated is first dipped into a froth of latex mixing capable of gelling on the application of heat, and then into a froth of latex mixing which does not gel on the application of heat. The former is then withdrawn from the mixing and is internally heated. The froth of latex mixing capable of gelling on the application of heat is thus coagulated. Coagulation proceeds from the surface in contact with the hot surface of the former or mould proceeding through the deposit to the inner surface of the applied layer of non-heat sensitive latex mixing. This outer non-coagulated layer is then washed as for instance with water or dilute alkali solution. In this manner no outer skin is formed on the coagulated froth of heat sensitive latex mixing.

According to another embodiment of the invention the surface of the frothy mass of the aqueous emulsions or dispersions aforesaid is subjected to the action of a coagulating medium which is also capable of swelling the rubber, thereby rapidly swelling and thus weakening the membranes forming the surface walls of the air cells to such an extent that the cells at the outer surface of the deposit are ruptured with escape of entrained air.

In this manner an outer surface is obtained consisting substantially of ruptured walls instead of a more or less continuous skin. For instance, a former or mould is dipped into a froth or latex mixing and the deposit obtained on withdrawal is immersed in a coagulating and swelling solution such as is described and claimed in Patent No. 1,886,351, November 1, 1932. For example a solution containing acetic acid or an aluminum salt as a coagulating agent and benzene and alcohol as a swelling agent may be used. The membranes forming the surface walls of the air cells become rapidly swollen and in this manner an outer surface is obtained consisting substantially of ruptured cells.

The emulsions or dispersions comprise by way of example those consisting of or containing rubber, guttapercha, balata or similar vegetable resins, occurring naturally or artificially obtained, and in vulcanised or unvulcanised condition.

Aqueous dispersions of coagulated rubber, vulcanised rubber, synthetic rubber, waste or reclaim, may also be employed, if desired, as alternatives or admixtures. All such materials are hereinafter generically termed "rubber material."

Any of the aforesaid dispersions may contain the usual known compounding ingredients.

Concentrates such as are described and claimed in Patent No. 1,846,164 of February 23, 1932, to which may be added any one or more of the usual compounding ingredients, preferably excepting those which would tend to form insoluble soaps or to increase the surface tension of the mixture may also be used.

The aqueous emulsions or dispersions are or can be rendered capable of gelling on the application of heat or substances can be added to cause the aqueous emulsions or dispersions to gel in the cold after a definite and controllable time interval.

Having now particularly described and ascertained the nature of our said invention and in what manner the same is to be performed, we declare that what we claim is:—

1. A process for the manufacture of goods of rubber material of sponge-like or cellular structure from aqueous emulsions or dispersions thereof which comprises setting the interior of a mass of a foamed aqueous dispersion of rubber material while still in the reversible condition and interrupting the setting of a surface of said mass.

2. A process of the type described which comprises dipping a former into a froth of latex mixing capable of gelling on the application of heat, then into a froth of latex mixing which does not gell on the application of heat and on withdrawal of the former heating it and subsequently washing off the outer non-coagulated layer.

3. A process as claimed in claim 1 wherein a former or mould is dipped into a froth of latex mixing and the deposit obtained on withdrawal is immersed in a coagulating and swelling solution comprising an acid and a rubber solvent.

4. A process as claimed in claim 1 wherein a former or mould is dipped in a suitable coagulant solution and then dipped in a froth of latex mixing and withdrawn and allowed to stand for a short period and washing the adhering froth with a dilute alkalin solution before coagulation reaches the outer surface of the deposit of froth.

5. A process for the manufacture of goods of rubber material of sponge-like or cellular structure from aqueous emulsions or dispersions thereof which comprises setting a mass of foamed aqueous dispersion of rubber material while still in the reversible condition by penetrating said mass with a setting medium, preventing the setting of an outer surface of said mass by said setting medium.

6. A process for the manufacture of goods of rubber material of sponge-like or cellular structure from aqueous emulsions or dispersions thereof which comprises dipping a former or mold into a suitable coagulant solution thereafter dipping said mold into a froth of latex mixing withdrawing said mold and washing the outer surface of the resulting deposit before coagulation has reached said surface.

7. A process for the manufacture of goods of rubber material of sponge-like or cellular structure which comprises setting a mass of foamed aqueous dispersion of rubber material and while said mass is still in reversible condition subjecting the surface thereof to a coagulating medium also containing an agent to swell the rubber.

EDWARD ARTHUR MURPHY.
ERIC WILLIAM BOWER OWEN.